No. 726,916. Patented May 5, 1903.

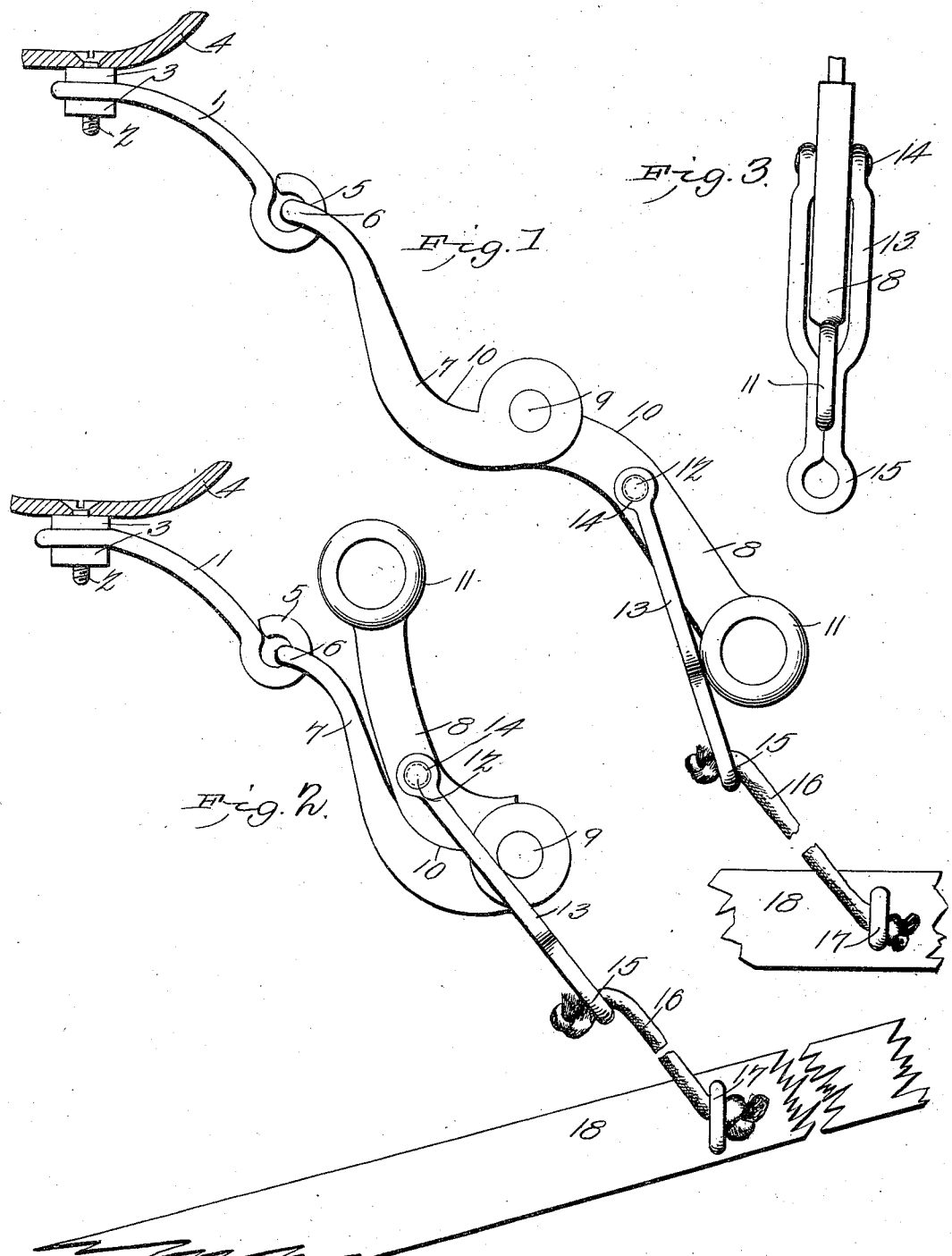

UNITED STATES PATENT OFFICE.

WILLIAM HENSLER, OF KOKOMO, INDIANA.

CORN-PLANTER ATTACHMENT.

SPECIFICATION forming part of Letters Patent No. 726,916, dated May 5, 1903.

Application filed January 30, 1903. Serial No. 141,185. (No model.)

*To all whom it may concern:*

Be it known that I, WILLIAM HENSLER, a citizen of the United States, residing at Kokomo, in the county of Howard and State of Indiana, have invented a new and useful Corn-Planter Attachment, of which the following is a specification.

My invention relates to attachments for corn-planters, and is especially designed for use with that type of wheeled corn-planters in which a marker is carried at the end of an arm pivotally mounted on the frame of the planter and extending out to one side in a direction substantially at right angles to the line of travel of the planter.

In most planters of the type above described an arm supporting the marker lies out of reach of the driver while in his seat, and upon the completion of every trip of the planter across the field it is necessary for the driver to leave his seat in order to shift the position of the marker or to have at each side of the field an additional hand to shift the marker for him. Neither of these courses of procedure is economical of time or labor, and it is a desideratum of considerable moment to have the marker-arm provided with means whereby the driver may shift its position without leaving his seat, thus securing economy of time or labor.

The object of my attachment to corn-planters is to provide a simple and inexpensive, but thoroughly practical and durable device, by means of which the driver may without leaving his seat lift the marker out of engagement with the ground at the end of each trip across the field and shift it to the desired position for the return trip. In attaining this end I make use of the construction and combination of parts shown in the accompanying drawings and hereinafter described.

In the drawings, Figure 1 is a view in side elevation of the corn-planter attachment, showing the marker-bar lowered. Fig. 2 is a side elevation of the corn-planter attachment, showing the marker-bar elevated. Fig. 3 is a detail plan view showing the construction of the link 13 and its relation to the link 8.

Referring to the drawings, 1 represents a bracket which is secured, by means of a screw 2 and jam-nuts 3 3, to the seat 4 or other portion of the corn-planter within easy reach of the driver while in his seat. At the lower end of the bracket 1 is provided an eye 5, which is engaged by an eye 6 in the upper end of a curved link 7. By means of this form of connection between the bracket and the link relative movement in any direction is rendered possible. At the lower end of the curved link 7 a reversely-curved link 8 is attached by means of a hinged joint 9, which permits movement in one plane only and which has its movement further limited by the shoulders 10 10, provided on the two links and adapted to contact when the links are in extended position. Pivotally mounted on the link 8 at a point 12 above the middle thereof is a third link 13, which is susceptible of movement in the same plane in which the second link moves. The link 13 is open at its upper end, as shown, and secured in position by means of a pin 14, the ends of which are upset to prevent the disengagement of the link. Toward the lower end the sides of the link 13 are brought together, so as to form what is practically a solid stem, which is adapted to come in contact with a head 11 upon the link 8 when the link 13 is swung upward. At the lower end of the link 13 is an eye 15 for attaching a cord 16 or other flexible connection with the eye 17, provided on the arm 18, which carries the marker. (Not shown.)

The bracket 1, the links 7, 8, and 13, and the cord 16 form a supporting connection between the seat or other suitable portion of the corn-planter and the marker-arm, and, owing to the peculiar curvature of the links 7 and 8 and the point of connection of the links 8 and 13, the length of the connection is adapted to be shortened by the driver at will. The shortening of the connection, which, as will be understood, causes the lifting of the marker-arm 18, is accomplished by catching hold of the head 11 upon the link 8, which forms a convenient handle, and swinging the link 8 upward until it lies in close contact with the link 7. When the links are in folded position, as shown in Fig. 2, the downward pull of the link 13 upon the link 8 tends to keep it in contact with the link 7 and to prevent a descent of the marker-arm.

This is a position in which the parts of the device should be kept during the turning of the corn-planter at the end of each row. After turning the driver may shift the marker-arm to the other side of the planter without leaving his seat and then by lowering the link 8 bring the marker again into contact with the ground.

From the foregoing description and account of the operation of my attachment for corn-planters it will be seen that the device is constructed of but few parts, none of which are expensive to manufacture, that the parts may be readily assembled, that the operation is simple and positive in character, and that there is nothing about it which is apt to wear out or to become inoperative.

Having thus described the construction and explained the operation of my invention, what I claim as new, and desire to secure by Letters Patent, is—

1. The combination with a corn-planter, of a pivoted marker-arm and a supporting connection between said marker-arm and a suitable portion of the corn-planter, said connection being adapted to be shortened by the driver at will, to raise said marker-arm and to remain shortened until elongated by the driver.

2. In combination with a corn-planter, a pivoted marker-arm, and a combined support and lifter for said arm comprising a series of foldable links adapted to be folded one upon another to shorten said support and adapted to be kept folded by the weight of the marker-arm.

3. In combination with a corn-planter, a pivoted marker-arm, a bracket secured to a suitable portion of the planter, a curved link mounted to swing freely in any direction on said bracket, a second curved link having hinged connection with the first-mentioned link and adapted to fold thereon, a third link having a pivotal connection with the second link at a point such that when the third link is folded upon the second and the second upon the first, the weight of the marker-arm will retain them in folded position, and a flexible connection between the last-mentioned link and the marker-arm.

4. In combination with a corn-planter having a pivoted marker-arm, a bracket rigidly secured to the seat of the planter and having an eye at its free end, a link having an eye in engagement with the eye of said bracket so as to move freely therein, a second link pivotally connected with the first-mentioned link and adapted to fold thereon, a third link comprising arms embracing the second link and pivotally connected therewith, and a solid portion at the point of juncture of said arms adapted to contact with the free end of the second link and having an eye at the free end thereof, and a flexible member extending from the eye at the free end of the third link to the pivoted marker-arm.

In testimony that I claim the foregoing as my own I have hereto affixed my signature in the presence of two witnesses.

WILLIAM HENSLER.

Witnesses:
PEARL FUNKHOUSER,
OSCAR C. SMITH.